United States Patent [19]
Ha

[11] Patent Number: 5,637,046
[45] Date of Patent: Jun. 10, 1997

[54] VARIABLE RATIO TRANSMISSION SYSTEM AND CLUTCH MECHANISM THEREFOR

[76] Inventor: Jin S. Ha, 17578 Tuscan Dr., Granada Hills, Calif. 91344

[21] Appl. No.: 538,599

[22] Filed: Oct. 4, 1995

[51] Int. Cl.⁶ ........................................... F16H 9/10
[52] U.S. Cl. .................. 474/53; 474/56; 474/70
[58] Field of Search .................... 474/49, 52, 53, 474/56, 70

[56] References Cited

U.S. PATENT DOCUMENTS

| | | | |
|---|---|---|---|
| 3,604,282 | 9/1971 | Shambaugh et al. | |
| 4,028,965 | 6/1977 | Stockton | 475/205 X |
| 4,157,667 | 6/1979 | Rinaldi | 74/365 |
| 4,259,874 | 4/1981 | Guirriec | 474/56 X |
| 4,591,351 | 5/1986 | Kumm et al. | 474/49 |
| 4,714,452 | 12/1987 | Kumm et al. | 474/49 |
| 5,011,458 | 4/1991 | Kumm | 474/49 |
| 5,443,423 | 8/1995 | Ha | 474/47 |

*Primary Examiner*—Roger J. Schoeppel
*Attorney, Agent, or Firm*—Birch, Stewart, Kolasch & Birch, LLP

[57] ABSTRACT

A variable ratio chain-belt transmission for use in a vehicle, includes a pair of variable ratio pulleys having a plurality of pins which are lined in a plurality of circles, a chain-belt engaging with both variable ratio pulleys. Different sized pulleys are formed by pushing and pulling the pins in and out of engagement with the chain-belt by activating various solenoids, whereby various pulley ratios are formed when the plurality of pins form different relative sized pulleys. A clutch mechanism for use with the variable ratio chain-belt transmission includes distinct forward and reverse clutch assemblies.

18 Claims, 5 Drawing Sheets

VARIABLE RATIO TRANSMISSION SYSTEM AND CLUTCH MECHANISM THEREFOR

BACKGROUND OF THE INVENTION

1. Field of the Invention

The present invention relates to improvements in the operating system and apparatus for variable ratio pulley and chain-belt automatic transmission systems for automobiles. More particularly, to automatic transmission systems which include a pair of variable pulleys having a plurality of moving pins and a chain-belt engaged with both variable pulleys. Such a transmission system is disclosed in Applicant's U.S. Pat. No. 5,443,423, issued Aug. 22, 1995, the contents of which are incorporated by reference into the present specification. The present invention provides smoother automobile performance and improves fuel economy.

2. Description of Related Art

There are many types of automatic transmissions which are well known in the art which utilize a torque converter for use in the automatic transmission. However, these automatic transmissions suffer from a number of disadvantages. For example, they are required to exhaust a large amount of gasoline for operating a hydraulic oil pressure system connected to the torque converter during shifting between gear range positions such as shifting from first gear to second gear, from second gear to third gear, from third gear to first gear, or from "P" park to "R" reverse. Furthermore, it is difficult to install or assemble such conventional transmission systems since they have a very complicated structure.

Other types of conventional transmissions include a pair of variable diameter cone-shaped pulleys and a belt which form a continuously variable transmission. However, these transmissions require a hydraulic oil pressure system, and have a short lifetime.

SUMMARY OF THE INVENTION

Accordingly, it is an object of the present invention to provide an improved chain-belt automatic transmission system for saving gasoline, which eliminates the above problems encountered with conventional automatic transmissions for automobiles.

Another object of the present invention is to provide a variable ratio pulley and chain-belt automatic transmission including a first variable pulley and a second variable pulley, and a chain-belt engaged with the relatively changeable first and second variable pulleys.

A further object of the present invention is to provide an automatic transmission system which does not require the use of a hydraulic oil pressure system as a basic component thereof.

Still another object of the present invention is to provide a variable ratio chain-belt automatic transmission system which is simple in structure, compact for portability, inexpensive to manufacture, durable in use, and contributes to improved fuel economy.

Yet another object of the present invention is to provide a clutch mechanism including distinct forward and reverse clutch assemblies for driving the automatic transmission.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
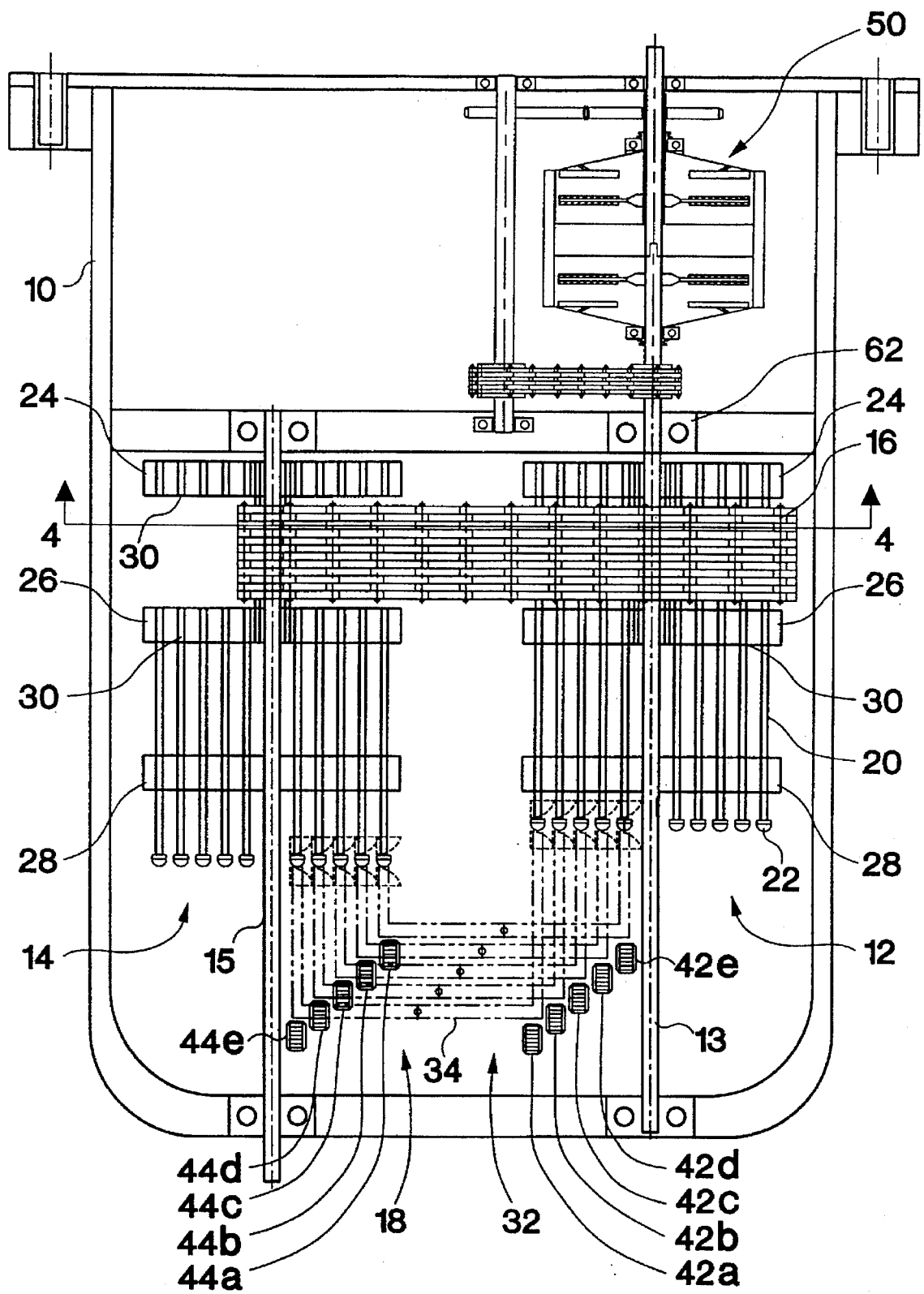
FIG. 1 is a plan view of a variable ratio pulley and chain-belt automatic transmission system showing the basic arrangement of the components according to the present invention.
Figure 2:
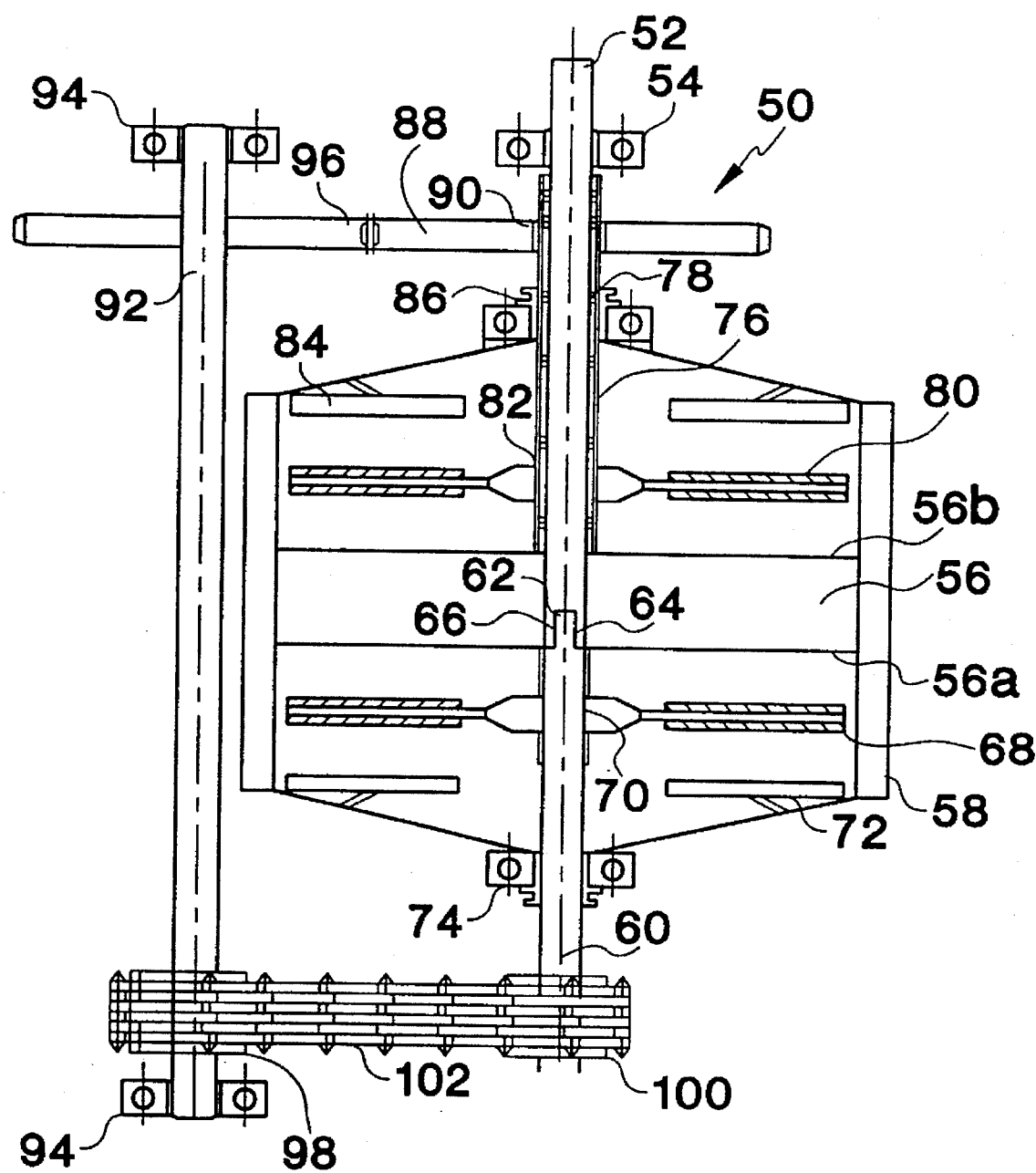
FIG. 2 is an enlarged plan view of the clutch mechanism of the automatic transmission system according to the present invention.
Figure 3:
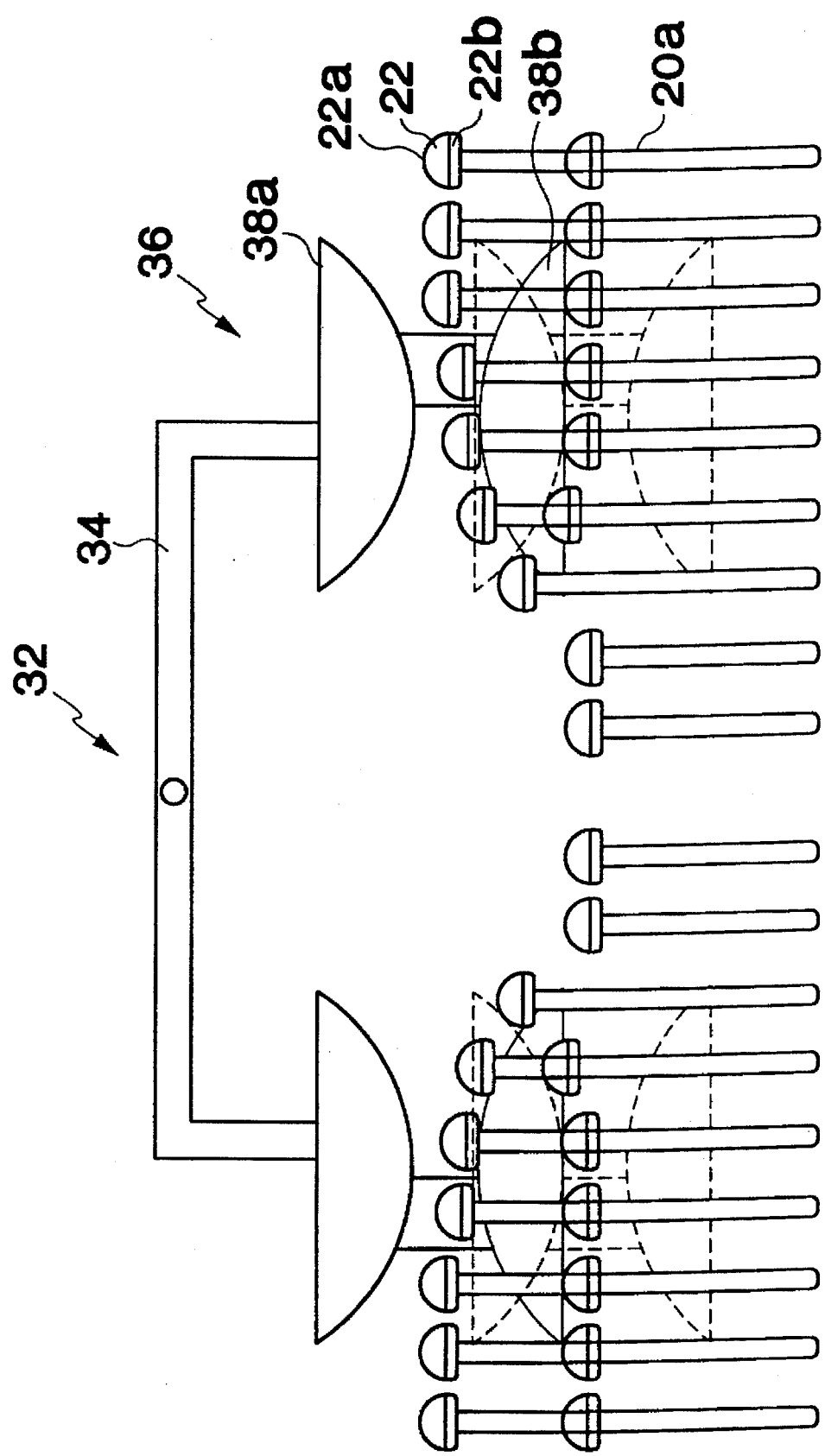
FIG. 3 is a schematic illustration of the pair of variable pulleys of the variable ratio chain-belt automatic transmission system showing the movement of the plurality of pins by the pin moving devices of the present invention.

Referring now in detail to the drawings for the purpose of illustrating preferred embodiments of the present invention, the variable ratio chain-belt automatic transmission comprises a housing 10, a first variable pulley 12 and a second variable pulley 14 disposed within said housing 10, a chain-belt 16 engaging the first variable pulley 12 and the second variable pulley 14, and an actuating mechanism 18 for changing the drive ratio between the first variable pulley 12 and the second variable pulley 14. The first variable pulley 12 is rotatable within the housing 10 via a first shaft 13. Similarly the second variable pulley 14 is rotatable within the housing 10 via a second shaft 15 substantially parallel to the first shaft 13. A clutch mechanism 50 is arranged in the housing 10, which will be described in more detail later.

Figure 4:
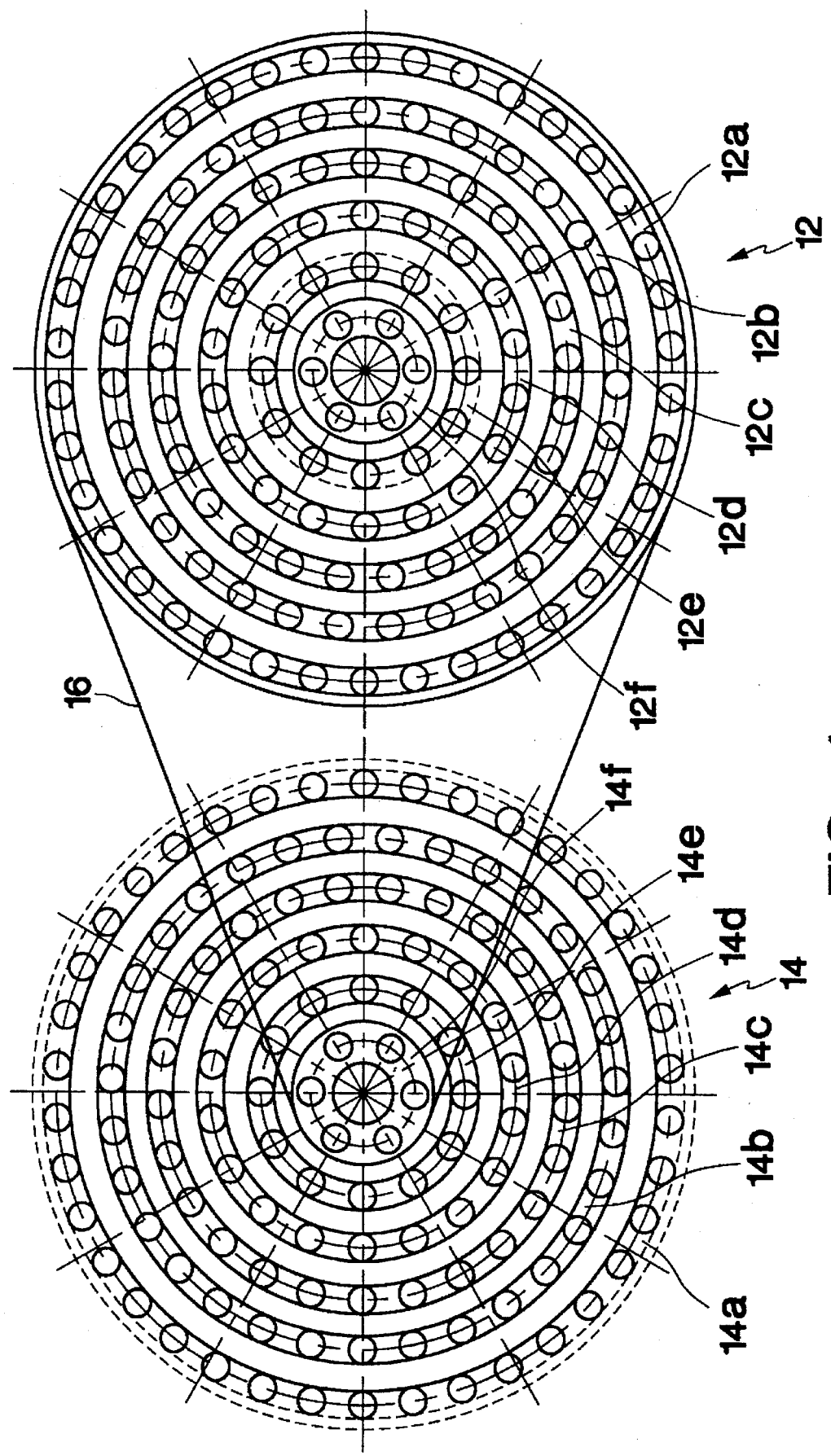
FIG. 4 is a schematic sectional illustration along lines 4—4 of FIG. 1 showing the chain belt engaged with a largest variable pulley and a smallest variable pulley of the present invention.

The first variable pulley 12 and the second variable pulley 14 contain a plurality of pins 20 having an elongated body 20a each provided with a pin head 22 having an outer surface 22a and an inner surface 22b. The elongated body 20a of the pins 20 can smoothly slide in first, second, and third disks 24, 26, and 28, respectively. The first, second, and third disks 24, 26, and 28 have a plurality of aligned apertures 30 disposed therein and these apertures 30 form gradually larger diameter concentric rings in the first, second, and third disks 24, 26, and 28. In FIGS. 1 and 4, there are at least five rings 12a–12e and 14a–14e having movable pins 20 therein. The number of rings can be more or less than five if necessary. A sixth innermost ring 12f and 14f is provided in each of the pulleys 12 and 14, respectively, which includes pins 20 which are not slidable within the disks 24, 26 and 28.

The chain-belt 16 engages the pins 20 in the first variable pulley 12 and the second variable pulley 14 for transmitting a drive force from the first variable pulley 12 to the second variable pulley 14. The actuating mechanism 18 includes a plurality of pin moving devices 32. Each of the pin moving devices 32 includes a lever 34 pivotally mounted about its midportion. A pair of camming devices 36 are attached at each end of the lever 34. Each of the camming devices 36 includes a first camming surface 38a and a second camming surface 38b. The first camming surface 38a is designed to contact the outer surface 22a of the pin heads 22 to thereby extend the pins 20, and the second camming surface 38b is designed to contact the inner surface 22b of the pin heads 22 to thereby retract the pins 20. The pivotal mounting of the pin moving devices 32 assures that the pins 20 in the first variable pulley 12 will be extended while the pins 20 in the second variable pulley 14 are retracted, and vice versa.

Figure 5:
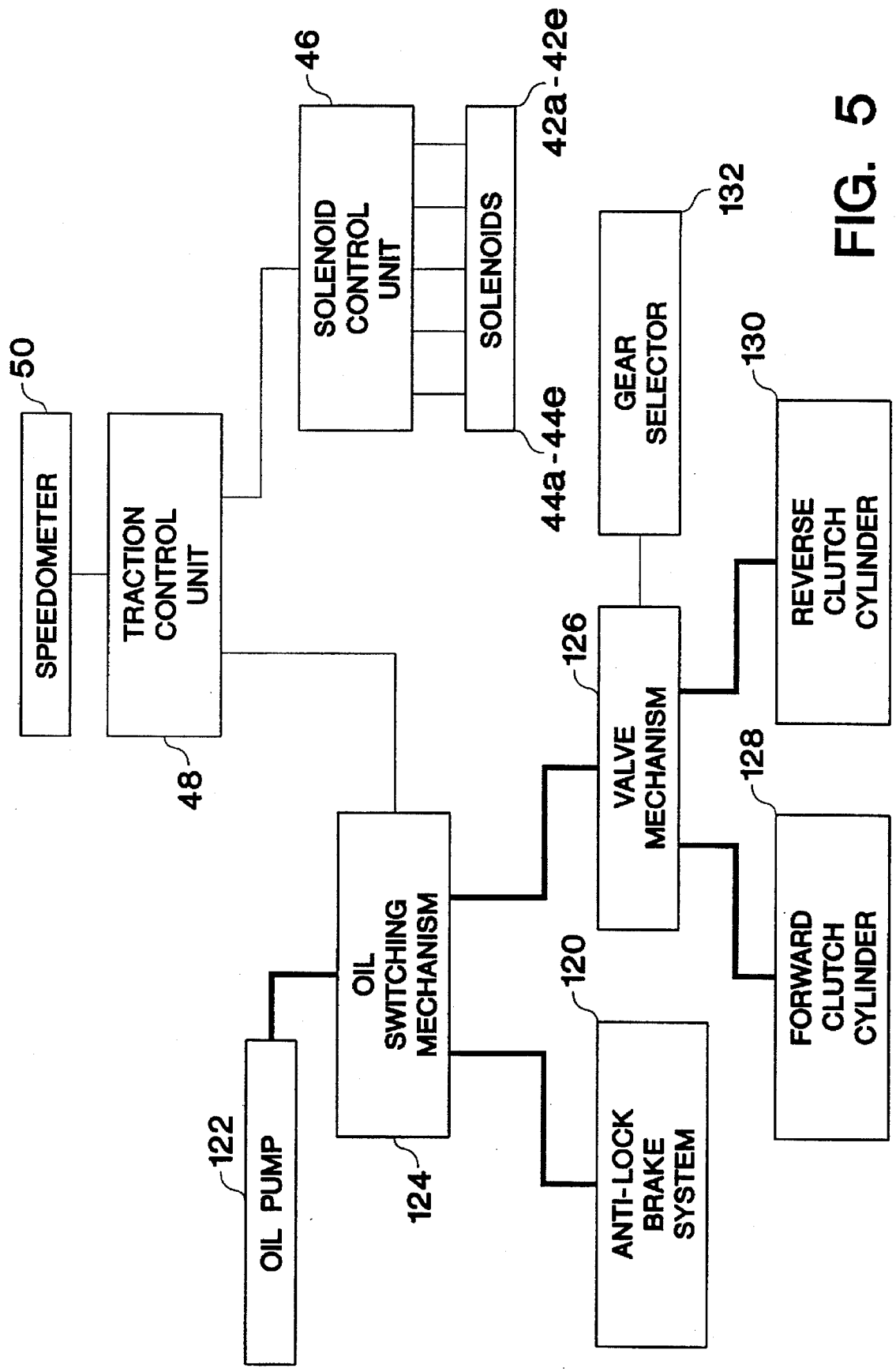
FIG. 5 is a block diagram of the various components that make up the operating system of the present invention.

A plurality of electromagnetic solenoids 42a–42e and 44a–44e are provided for actuating the various pin moving devices 32. As shown in FIG. 5, each of the electromagnetic solenoids 42a–42e and 44a–44e are controlled by a solenoid control unit 46 in response to a signal provided by a traction control unit 48. The traction control unit 48 receives a speed signal from the speedometer 50, and sends a signal to the solenoid control unit 46, which interprets the signal and actuates appropriate ones of the solenoids 42a–42e and 44a–44e when it is necessary for the transmission to shift.

The operation of the variable ratio chain-belt transmission system will now be described. FIG. 4 illustrates the transmission in the highest gear, or sixth gear. Here, the chain-belt 16 is engaged with the pins 20 of the largest diameter ring 12a of the first variable pulley 12 and the smallest diameter ring 14f of the second variable pulley. When it is necessary for the transmission to downshift from sixth gear into fifth gear, a signal from the traction control unit 48 is sent to the solenoid control unit 46, which actuates the appropriate electromagnetic solenoids 42a and 44e. Upon energization of the solenoids 42a and 44e, the camming surface 38b causes the pins 20 in ring 12a to be retracted, while simultaneously the camming surface 38a cause the pins 20 in ring 14e to be extended. This allows the chain-belt 16 to move from ring 12a to ring 12b, and from ring 14f to 14e, thus placing the transmission in fifth gear. Each of the shifts is controlled in a similar manner.

When the transmissions in first gear, the chain-belt 16 is engaged with the pins 20 of the smallest diameter ring 12f of the first variable pulley 12 and the largest diameter ring 14a of the second variable pulley. When it is necessary for the transmission to shift from first gear into second gear, a signal from the traction control unit 48 is sent to the solenoid control unit 46, which actuates the appropriate electromagnetic solenoids 42e and 44a. Upon energization of the solenoids 42e and 44a, the camming surface 38a causes the pins 20 in ring 12e to be extended, while simultaneously the camming surface 38b causes the pins 20 in ring 14a to be retracted. This allows the chain-belt 16 to move from ring 12f to ring 12e, and from ring 14a to 14b, thus placing the transmission in second gear. Similarly, to shift from second gear into third gear, pins 20 in ring 12d are extended, while simultaneously pins 20 in ring 14b are retracted. This allows the chain-belt 16 to move from ring 12e to ring 12d, and from ring 14b to 14c, thus placing the transmission in third gear. Each of the remaining shifts operate in a similar manner.

The clutch mechanism 50 according to the present invention includes an input shaft 52 rotatably mounted to the housing 10 by a bearing 54. The input shaft is rotatably driven by a power source (not shown) such as an internal combustion engine or an electric motor. A flywheel 56 is attached to one end of the input shaft 52 for rotation therewith. The flywheel 56 has a first side surface 56a and a second opposed side surface 56b. An outer cylindrical housing member 58 is fixed to the circumferential periphery of the flywheel 56 for rotation therewith. Preferably, the input shaft 52, the flywheel 56, and the outer cylindrical housing member 58 are manufactured as a single unit from one piece of material. However, each of the input shaft 52, the flywheel 56, and the outer cylindrical housing member 58 may be separately manufactured and assembled into one integral unit.

An output shaft 60 is rotatably mounted to the housing 10 by a bearing 62. In a preferred embodiment, the output shaft 60 and the first shaft 13 constitute the same shaft. However, the output shaft 60 and the first shaft 13 may be configured as separate shafts joined together by an appropriate shaft coupling mechanism. The output shaft 60 is aligned with and coaxial with the input shaft 52. An extension 62 located at one end of the output shaft 60 is received in a cavity 64 in one end of the input shaft 52. A bearing 66 allows free rotation of the extension 62 within the cavity 64, thus allowing relative rotation between the input shaft 52 and the output shaft 60.

A first clutch disk 68 is attached to the output shaft 60 by a spline connection 70. A first pressure plate 72 is operatively connected with the outer cylindrical housing member 58 for rotation therewith. A first throwout bearing 74 rotatably journaled on the output shaft 60 is operable to move the first pressure plate 72 between a non-engaged position and an engaged position.

In the non-engaged position, the first pressure plate 72, the first clutch disk 68, and the first side surface 56a of the flywheel 56 are all spaced apart from one another such that rotation of the flywheel 56 and the first pressure plate 72 does not cause the first clutch disk 68 to rotate therewith. In the engaged position, the first pressure plate 72, the first clutch disk 68, and the first side surface 56a of the flywheel 56 are pressed together such that rotation of the flywheel 56 and the first pressure plate 72 in one direction causes the first clutch disk 68 and the output shaft 60 to rotate in that same direction. Thus, the output shaft 60 rotates in the same direction as the input shaft 52, and this is considered the forward direction.

An outer tubular shaft 76 is coaxial with and rotatably surrounds a portion of the input shaft 52. Bearings 78 are provided between the input shaft 52 and the outer tubular shaft 76 to allow free rotation of the outer tubular shaft 76 with respect to the input shaft 52. A second clutch disk 80 is attached to the outer tubular shaft 76 by a spline connection 82. A second pressure plate 84 is operatively connected with the outer cylindrical housing member 58 for rotation therewith. A second throwout bearing 86 rotatably journaled on the outer tubular shaft 76 is operable to move the second pressure plate 84 between a non-engaged position and an engaged position.

A first helical gear 88 is attached to the outer tubular shaft 76 by a spline connection 90. An idler shaft 92 spaced from and parallel with the input shaft 52 is rotatably attached to the housing 10 via bearings 94. A second helical gear 96 is fixed to the idler shaft 92 near one end of the idler shaft 92 and is engaged with the first helical gear 88. Thus, rotation of the outer tubular shaft 76 in one direction causes the idler shaft 92 to rotate in the opposite direction.

A first sprocket 98 is fixed to the idler shaft 92 near the other end of the idler shaft 92. A second sprocket 100 is fixed to the output shaft 60. A chain 102 engages with the first sprocket 98 and the second sprocket 100 such that rotation of the idler shaft 92 in one direction causes the output shaft 60 to rotate in the same direction.

In the non-engaged position, the second pressure plate 84, the second clutch disk 80, and the second side surface 56b of the flywheel 56 are all spaced apart from one another such that rotation of the flywheel 56 and the second pressure plate 84 does not cause the second clutch disk 80 to rotate therewith. In the engaged position, the second pressure plate 84, the second clutch disk 80, and the second side surface 56b of the flywheel 56 are pressed together such that rotation of the flywheel 56 and the second pressure plate 84 in one direction causes the second clutch disk 80 and the outer tubular shaft 76 to rotate in that same direction. Rotation of the outer tubular shaft 76 in that same direction causes the idler shaft 92 to rotate in the opposite direction due to the interaction between the first helical gear 88 and the second helical gear 96. The rotational direction of the idler shaft 92 is transmitted to the output shaft 60 via the chain 102 and the sprockets 98 and 100. Thus, the output shaft 60 rotates in the opposite direction as the input shaft 52, and this is considered the reverse direction.

To summarize, the output shaft 60 rotates in a first direction when the first clutch disk 68 is engaged with the flywheel 56, and the output shaft 60 rotates in a second opposite direction when the second clutch disk 80 is engaged with the flywheel 56.

A control system for the clutch mechanism for use with motor driven vehicles will now be explained with reference to FIG. 5. Typically, modern automobiles are provided with an anti-lock brake system 120 in addition to a traction control system 48. An oil pump 122 is provided for producing pressurized oil, which is supplied to the anti-lock brake system 120 when braking is desired. An oil switching mechanism 124 containing suitable electrically operated valves or the like directs the flow of pressurized oil between the anti-lock brake system 120 and a valve mechanism 126 which controls the clutch mechanism 50.

A forward clutch cylinder 128 is operatively connected with the first throwout bearing 74 such that the first pressure plate 72 is moved to the engaged position when pressurized oil is supplied to the forward clutch cylinder 128. A reverse clutch cylinder 130 is operatively connected with the second throwout bearing 86 such that the second pressure plate 80 is moved to the engaged position when pressurized oil is supplied to the reverse clutch cylinder 130. The valve mechanism 126 receives a gear selection signal from a gear selector 132. The valve mechanism 126 directs the flow of pressurized oil to the forward clutch cylinder 128 when the gear selector 132 is set to "D" (drive) or any forward gear. The valve mechanism 126 directs the flow of pressurized oil to the reverse clutch cylinder 130 when the gear selector 132 is set to "R" (reverse) or any reverse gear.

The invention being thus described, it will be obvious that the same may be varied in many ways. For example, the splines may be replaced by a key in a suitable keyway, or by other connection means such as welding. The bearings can be ball, roller, sleeve or any friction reducing medium. The helical gears can be replaced by spur gears or other suitable gearing devices. Additionally, the placement of the helical gears and the sprocket and chain assembly may be reversed. Finally, the application of the transmission and clutch mechanism may be varied, since the invention is applicable to motor vehicles as well as any machinery requiring a transmission between a drive motor and an output shaft. Such variations are not to be regarded as a departure from the spirit and scope of the invention, and all such modifications as would be obvious to one skilled in the art are intended to be included within the scope of the following claims.

I claim:

1. A variable ratio chain-belt transmission system comprising:
   a first variable pulley and a second variable pulley, each of said first and second variable pulleys including first and second disks, each of said first and second disks having a plurality of aligned apertures being formed in gradually different diameter concentric rings, and a plurality of pins slidable within said apertures in said second disk and slidably insertable into selected ones of said aligned apertures in said first disk for forming different diameter pulleys,
   a chain-belt engaging with said first and second variable pulleys, and
   actuating means for moving selected ones of said pins on each of said variable pulleys for forming various ratios between said pulleys.

2. The variable ratio chain-belt transmission system as set forth in claim 1, wherein said actuating means includes:
   a plurality of pin moving devices, each of said pin moving devices having first camming means for selectively extending and retracting selected ones of said pins on said first variable pulley, and second camming means for selectively extending and retracting selected ones of said pins on said second variable pulley.

3. The variable ratio chain-belt transmission system as set forth in claim 2, wherein each of said pins includes an elongated body portion and a head located at one end thereof, and wherein each of said first and second camming means includes a first camming surface for engaging an outer portion of said heads of selected ones of said pins to thereby extend said selected ones of said pins, and a second camming surface for engaging an inner portion of said heads of selected ones of said pins to thereby retract said selected ones of said pins.

4. The variable ratio chain-belt transmission system as set forth in claim 2, wherein said pin moving devices are pivotally mounted such that said first camming means and said second camming means move in opposite directions, such that one set of pins may be extended in one of said pulleys as another set of pins is retracted in the other of said pulleys.

5. The variable ratio chain-belt transmission system as set forth in claim 2, further including a plurality of solenoids for driving said pin moving devices.

6. The variable ratio chain-belt transmission system as set forth in claim 5, further including means for automatically actuating selected ones of said solenoids in response to a signal received from a traction control unit so as to change the ratio between said pulleys.

7. The variable ratio chain-belt transmission system as set forth in claim 1, wherein each of said pulleys includes an innermost ring of pins which are immovable.

8. The variable ratio chain-belt transmission system as set forth in claim 1, wherein each pulley further includes a third disk having a plurality of said aligned apertures for supporting said pins in said pulleys.

9. A clutch mechanism comprising:
   an input shaft and an output shaft;
   a rotatable flywheel operatively attached to said input shaft, said rotatable flywheel having a first side surface and a second opposite side surface;
   a first clutch disk operatively attached to said output shaft, said first clutch disk being engagable with said first side surface of said rotatable flywheel;
   a second clutch disk engagable with said second side surface of said rotatable flywheel; and means for independently actuating said first clutch disk and said second clutch disk;

whereby said output shaft rotates in a first direction when said first clutch disk is engaged with said flywheel, and said output shaft rotates in a second opposite direction when said second clutch disk is engaged with said flywheel.

10. The clutch mechanism as set forth in claim 9, wherein said input shaft and said output shaft are coaxially aligned.

11. The clutch mechanism as set forth in claim 10, further including a bearing located between said input shaft and said output shaft.

12. The clutch mechanism as set forth in claim 9, further including gear means for transmitting rotation of said second clutch disk to said output shaft.

13. The clutch mechanism as set forth in claim 12, wherein said gear means includes:

an idler shaft spaced from and parallel with said input shaft;

a first gear operatively attached to said second clutch disk;

a second gear attached to said idler shaft and engaged with said first gear;

a first sprocket attached to said idler shaft;

a second sprocket attached to said output shaft; and a chain drivingly engaged with said first sprocket and said second sprocket.

14. The clutch mechanism as set forth in claim 13, further including an outer tubular shaft coaxial with and surrounding a portion of said input shaft, said second clutch disk being attached to a first end portion of said outer tubular shaft, and said first gear being attached to a second end portion of said outer tubular shaft.

15. The clutch mechanism as set forth in claim 9, further including an outer cylindrical housing member for housing said flywheel and said clutch disks therein.

16. The clutch mechanism as set forth in claim 15, wherein said input shaft, said flywheel, and said outer cylindrical housing member are formed as one piece.

17. The clutch mechanism as set forth in claim 9, wherein said means for independently actuating said first clutch disk and said second clutch disk includes:

a first pressure plate for engaging said first clutch disk with said flywheel;

a first clutch cylinder for operating said first pressure plate;

a second pressure plate for engaging said second clutch disk with said flywheel;

a second clutch cylinder for operating said second pressure plate;

valve means for selectively and alternatively actuating said first and second clutch cylinders.

18. A variable ratio chain-belt transmission system and clutch mechanism, said variable ratio chain-belt transmission system comprising:

a first variable pulley and a second variable pulley, each variable pulley including first and second disks, each of said disks having a plurality of aligned apertures being formed in gradually different diameter concentric rings, and a plurality of pins slidable within said apertures in said second disk and slidably insertable into selected ones of said aligned apertures in said first disk for forming different diameter pulleys, a chain-belt engaging with said first and second variable pulleys, and actuating means for moving selected ones of said pins on each of said variable pulleys for forming various ratios between said pulleys;

said clutch mechanism comprising:

an input shaft and an output shaft;

a rotatable flywheel operatively attached to said input shaft, said rotatable flywheel having a first side surface and a second opposite side surface;

a first clutch disk operatively attached to said output shaft, said first clutch disk being engagable with said first side surface of said rotatable flywheel;

a second clutch disk engagable with said second side surface of said rotatable flywheel; and means for independently actuating said first clutch disk and said second clutch disk;

whereby said output shaft rotates in a first direction when said first clutch disk is engaged with said flywheel, and said output shaft rotates in a second opposite direction when said second clutch disk is engaged with said flywheel.

* * * * *